US011196738B2

(12) United States Patent
Brown et al.

(10) Patent No.: US 11,196,738 B2
(45) Date of Patent: Dec. 7, 2021

(54) IDENTIFICATION AND AUTHENTICATION OF A USER USING IDENTITY-LINKED DEVICE INFORMATION FOR FACILITATION OF NEAR-FIELD EVENTS

(71) Applicant: Averon US, Inc., Henderson, NV (US)

(72) Inventors: Wendell Brown, Henderson, NV (US); Mark Klein, Henderson, NV (US); Lea Tarnowski, Henderson, NV (US)

(73) Assignee: Averon US, Inc., Henderson, NV (US)

( * ) Notice: Subject to any disclaimer, the term of this patent is extended or adjusted under 35 U.S.C. 154(b) by 389 days.

(21) Appl. No.: 16/407,956

(22) Filed: May 9, 2019

(65) Prior Publication Data

US 2019/0349361 A1  Nov. 14, 2019

Related U.S. Application Data

(60) Provisional application No. 62/669,046, filed on May 9, 2018.

(51) Int. Cl.
*G06K 7/01* (2006.01)
*H04L 29/06* (2006.01)
(Continued)

(52) U.S. Cl.
CPC .......... H04L 63/0853 (2013.01); G06F 21/35 (2013.01); G06Q 20/3278 (2013.01);
(Continued)

(58) Field of Classification Search
CPC ............... G06Q 20/341; G06Q 10/087; G06Q 20/3278; G06Q 20/353; G06K 19/01; G06K 19/06
(Continued)

(56) References Cited

U.S. PATENT DOCUMENTS 7,748,636 B2 * 7/2010 Finn ..................... H04B 5/0062
235/492
7,784,684 B2 * 8/2010 Labrou ............. G06Q 20/3274
235/380
(Continued)

FOREIGN PATENT DOCUMENTS

EP 2739072 A1 6/2014

OTHER PUBLICATIONS

International Search Report and Written Opinion for Application No. PCT/US2019/031586 dated Jul. 17, 2019.

*Primary Examiner* — Daniel St. Cyr
(74) *Attorney, Agent, or Firm* — Weaver Austin Villeneuve & Sampson LLP

(57) ABSTRACT

Embodiments of the present disclosure provide apparatuses, systems, methods, and computer program products, for identification and confirmation of a user entity associated with a near-field item. An apparatus may be provided, the apparatus configured to receive, from a user device, an electronic data transmission associated with the user device and indicative of response to a near-field verification prompt. The electronic data transmission is received over a carrier network including a carrier device configured to inject identity-linked device information using a header enrichment process. The apparatus further determines an identification confirmation indicator based on the identity-linked device information; transmits, to the user device, an identification completed notification for forwarding to a service provider device; receives, from the service provider device, an identification verification query and, in response, provides the identification confirmation indicator. If successfully confirmed, a service provider device may provide services associated with the near-field item.

24 Claims, 5 Drawing Sheets

(51) Int. Cl.
*G06F 21/35* (2013.01)
*G06Q 20/32* (2012.01)
*H04B 5/00* (2006.01)
*H04W 12/06* (2021.01)
*G06K 19/07* (2006.01)

(52) U.S. Cl.
CPC ......... *H04B 5/0031* (2013.01); *H04B 5/0056* (2013.01); *H04L 63/102* (2013.01); *H04W 12/06* (2013.01); *G06K 19/0723* (2013.01)

(58) Field of Classification Search
USPC .............................. 235/380, 382, 385; 726/4
See application file for complete search history.

(56) References Cited

U.S. PATENT DOCUMENTS

| | | | |
|---|---|---|---|
| 7,840,237 B2 * | 11/2010 | Panabaker | H04W 4/00 |
| | | | 455/566 |
| 15,424,595 | 2/2017 | Brown | |
| 9,603,019 B1 * | 3/2017 | Ramatchandirane | ........................ |
| | | | G06Q 20/401 |
| 10,008,057 B2 * | 6/2018 | Ives-Halperin | H04W 4/021 |
| 10,701,560 B1 * | 6/2020 | Lerner | G06Q 20/40 |
| 10,755,281 B1 * | 8/2020 | Yip | G06Q 20/4016 |
| 10,783,722 B2 * | 9/2020 | Madaan | H04W 8/005 |
| 2017/0154483 A1 | 6/2017 | Cordiner et al. | |

* cited by examiner

US 11,196,738 B2

IDENTIFICATION AND AUTHENTICATION OF A USER USING IDENTITY-LINKED DEVICE INFORMATION FOR FACILITATION OF NEAR-FIELD EVENTS

CROSS-REFERENCE TO RELATED APPLICATIONS

This application claims priority to U.S. Provisional Application No. 62/669,046 filed May 9, 2018, the content of which is incorporated herein by reference in its entirety.

TECHNOLOGICAL FIELD

Embodiments of the present disclosure relate, generally, to user identification of a user entity associated with a near-field item in a near-field event, and more specifically, to improved user identification and authentication of a user entity associated with a near-field item in a near-field event using trusted identity-linked device information retrieved from a user device associated with the near-field item.

BACKGROUND

Near-field communications (NFC), and associated devices, enables a tag, such as a radio-frequency identification (RFID) tag or NFC tag, to store information and transmit some or all of the stored information to a terminal associated with a service provider during a transaction or event when the tag is brought in close proximity to the terminal. Such information may be intercepted by third-party devices caused by malicious users, and the user and service provider risk that a malicious user may impersonate the rightful user associated with the tag. Applicant has discovered problems with current systems, methods, apparatuses, and computer program products for identifying a user, and/or confirming/authenticating a user identity of a user, associated with a NFC transaction. Through applied effort, ingenuity, and innovation, Applicant has solved many of these identified problems by developing a solution provided in embodiments of the present disclosure, which is described in detail below.

BRIEF SUMMARY

In general, embodiments of the present disclosure provided herein include systems, methods, apparatuses, and computer readable media for improved user identification and authentication of a user entity associated with a near-field item in a near-field event using trusted identity-linked device information retrieved from a user device associated with the near-field item.

Other systems, apparatuses, methods, computer readable media, and features will be, or will become, apparent to one with skill in the art upon examination of the following figures and detailed description. It is intended that all such additional systems, apparatuses, methods, computer readable media, and features included within this description be within the scope of the disclosure, and be protected by the following claims.

In general, embodiments of the present disclosure provided herein include systems, methods, apparatuses, and computer readable media for improved user identification and authentication of a user entity associated with a near-field item in a near-field event using trusted identity-linked device information retrieved from a user device associated with the near-field item.

Other systems, apparatuses, methods, computer readable media, and features will be, or will become, apparent to one with skill in the art upon examination of the following figures and detailed description. It is intended that all such additional systems, apparatuses, methods, computer readable media, and features included within this description be within the scope of the disclosure, and be protected by the following claims.

In some embodiments, an apparatus for identification and confirmation of a user entity associated with a near-field item. The apparatus includes at least one processor and at least one memory, the at least one memory having computer-coded instructions therein. The computer-coded instructions are configured to, in execution with the at least one processor, cause the apparatus to receive, at the apparatus from a user device associated with the near-field item, via a carrier network comprising at least a carrier device, an electronic data transmission associated with the user device and indicative of response, by the user device, to a near-field verification prompt received in response to a near-field event associated with the near-field item, wherein the carrier device is configured to inject the electronic data transmission with identity-linked device information via a header enrichment process. The computer-coded instructions are further configured to cause the apparatus to determine an identification confirmation indicator based on the identity-linked device information. The computer-coded instructions are further configured to cause the apparatus to transmit, to the user device, an identification completed notification configured to cause the user device to forward a portion of the identification completed notification to a service provider device associated with the near-field event, wherein the forwarded portion of the identification completed notification comprises at least access information for retrieving the identification confirmation indicator. The computer-coded instructions are further configured to cause the apparatus to receive, from the service provider device, an identification verification query comprising at least the access information. The computer-coded instructions are further configured to cause the apparatus to transmit the identification confirmation indicator to the service provider device in response to the identification verification query.

In some embodiments, the computer-coded instructions are further configured to generate an access identifier associated with the identification confirmation indicator, wherein the access information comprises at least the access identifier, and wherein the identification verification query comprises at least the access identifier. In some such embodiments, the computer-coded instructions are further configured to identify the identification confirmation indicator based on the access identifier received from the service provider device, for responding to the identification verification query.

In some embodiments, the computer-coded instructions to determine the identification confirmation indicator are configured to receive an item identifier associated with the near-field item; retrieve approved information associated with the item identifier; and determine whether the approved information comprises at least the identity-linked device information, wherein the identification confirmation indicator is based on the determination.

In some embodiments, the computer-coded instructions are further configured to generate an identification confirmation record; and store the identification confirmation record to a record repository.

In some embodiments of the apparatus, identity-linked device information is a mobile telephone number in a plain text format or a hashed format. In some embodiments of the apparatus, the record repository comprises a blockchain configured to store at least one identification confirmation record. In some embodiments, the near-field item is a NFC tag or a RFID tag. In some embodiments, the identification confirmation indicator represents an identification success indicator, and the transmission of the identification confirmation indicator to the service provider device is configured to cause the service provider device to authorize a transaction associated with the near-field event.

In some embodiments, a computer-implemented method may be provided for identification and confirmation of a user entity associated with a near-field item. The method includes receiving, from a user device associated with the near-field item, via a carrier network comprising at least a carrier device, an electronic data transmission associated with the user device and indicative of response, by the user device, to a near-field verification prompt received in response to a near-field event associated with the near-field item, wherein the carrier device is configured to inject the electronic data transmission with identity-linked device information via a header enrichment process. The method further includes determining an identification confirmation indicator based on the identity-linked device information. The method further includes transmitting, to the user device, an identification completed notification configured to cause the user device to forward a portion of the identification completed notification to a service provider device associated with the near-field event, wherein the forwarded portion of the identification completed notification comprises at least access information for retrieving the identification confirmation indicator. The method further includes receiving, from the service provider device, an identification verification query comprising at least the access information. The method further includes transmitting the identification confirmation indicator to the service provider device in response to the identification verification query.

In some embodiments, the method further includes generating an access identifier associated with the identification confirmation indicator, wherein the access information comprises at least the access identifier, and wherein the identification verification query comprises at least the access identifier; and identifying the identification confirmation indicator based on the access identifier received from the service provider device.

In some embodiments of the method, determining the identification confirmation indicator comprises receiving an item identifier associated with the near-field item; retrieving approved information associated with the item identifier; and determining whether the approved information comprises at least the identity-linked device information, wherein the identification confirmation indicator is based on the determination.

In some embodiments, the method further comprises generating an identification confirmation record; and storing the identification confirmation record to a record repository.

In some embodiments of the method, the identity-linked device information is a mobile telephone number in a plain text format or a hashed format. In some embodiments of the method, the record repository comprises a blockchain configured to store at least one identification confirmation record. In some embodiments of the method, the near-field item comprises a NFC tag or a RFID tag. In some embodiments of the method, the identification confirmation indicator represents an identification success indicator, and wherein transmitting the identification confirmation indicator to the service provider device is configured to cause the service provider device to authorize a transaction associated with the near-field event.

In some embodiments, a computer program product may be provided for identification and confirmation of a user entity associated with a near-field item. The computer-program product includes a non-transitory computer readable storage medium having computer program instructions stored therein. The computer program instructions are configured to, when executed by a processor, cause the processor to receive, at the at least one processor from a user device associated with the near-field item, via a carrier network comprising at least a carrier device, an electronic data transmission associated with the user device and indicative of response, by the user device, to a near-field verification prompt received in response to a near-field event associated with the near-field item, wherein the carrier device is configured to inject the electronic data transmission with identity-linked device information via a header enrichment process. The program code instructions are further configured to cause the processor to determine an identification confirmation indicator based on the identity-linked device information. The program code instructions are further configured to cause the processor to transmit, to the user device, an identification completed notification configured to cause the user device to forward a portion of the identification completed notification to a service provider device associated with the near-field event, wherein the forwarded portion of the identification completed notification comprises at least access information for retrieving the identification confirmation indicator. The program code instructions are further configured to cause the processor to receive, from the service provider device, an identification verification query comprising at least the access information. The program code instructions are further configured to cause the processor to transmit the identification confirmation indicator to the service provider device in response to the identification verification query.

In some embodiments of the computer program product, the computer program instructions are further configured to cause the processor to generate an access identifier associated with the identification confirmation indicator, wherein the access information comprises at least the access identifier, and wherein the identification verification query comprises at least the access identifier; and identify the identification confirmation indicator based on the access identifier received from the service provider device.

In some embodiments of the computer program product, the computer program instructions to determine the identification confirmation indicator are configured to receive an item identifier associated with the near-field item; retrieve approved information associated with the item identifier; and determine whether the approved information comprises at least the identity-linked device information, wherein the identification confirmation indicator is based on the determination. In some embodiments of the computer program product, the computer program instructions are further configured to generate an identification confirmation record; and store the identification confirmation record to a record repository.

In some embodiments of the computer program product, the identity-linked device information is a mobile telephone number in a plain text format or a hashed format. In some embodiments of the computer program product, the record repository comprises a blockchain configured to store at least one identification confirmation record. In some embodiments of the computer program product, the near-field item comprises a NFC tag or a RFID tag. In some embodiments of the computer program product, the identification confirmation indicator represents an identification success indicator, and wherein the transmission of the identification confirmation indicator to the service provider device is configured to cause the service provider device to authorize a transaction associated with the near-field event.

BRIEF DESCRIPTION OF THE DRAWINGS

Figure 1:
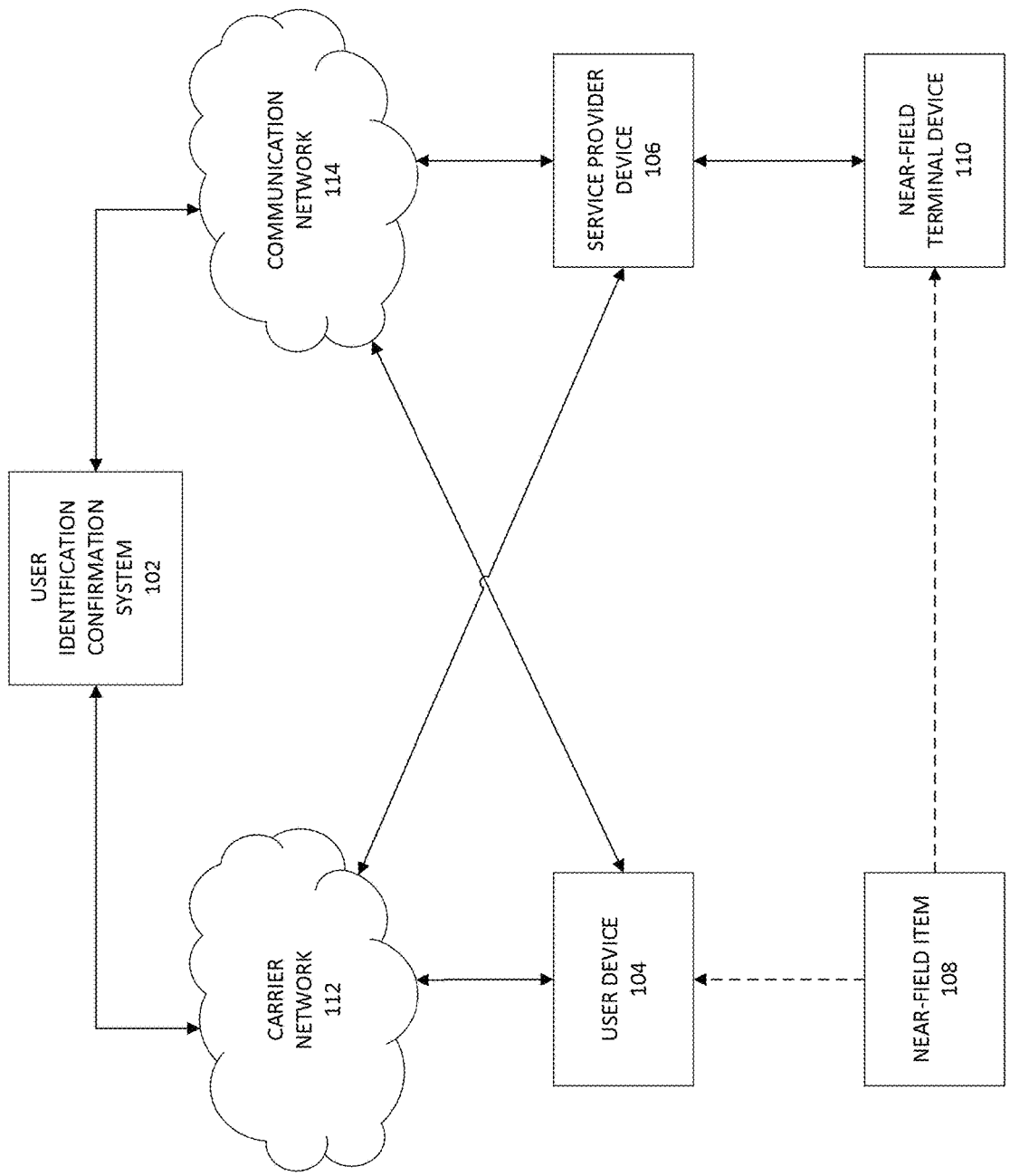
Figure 2:
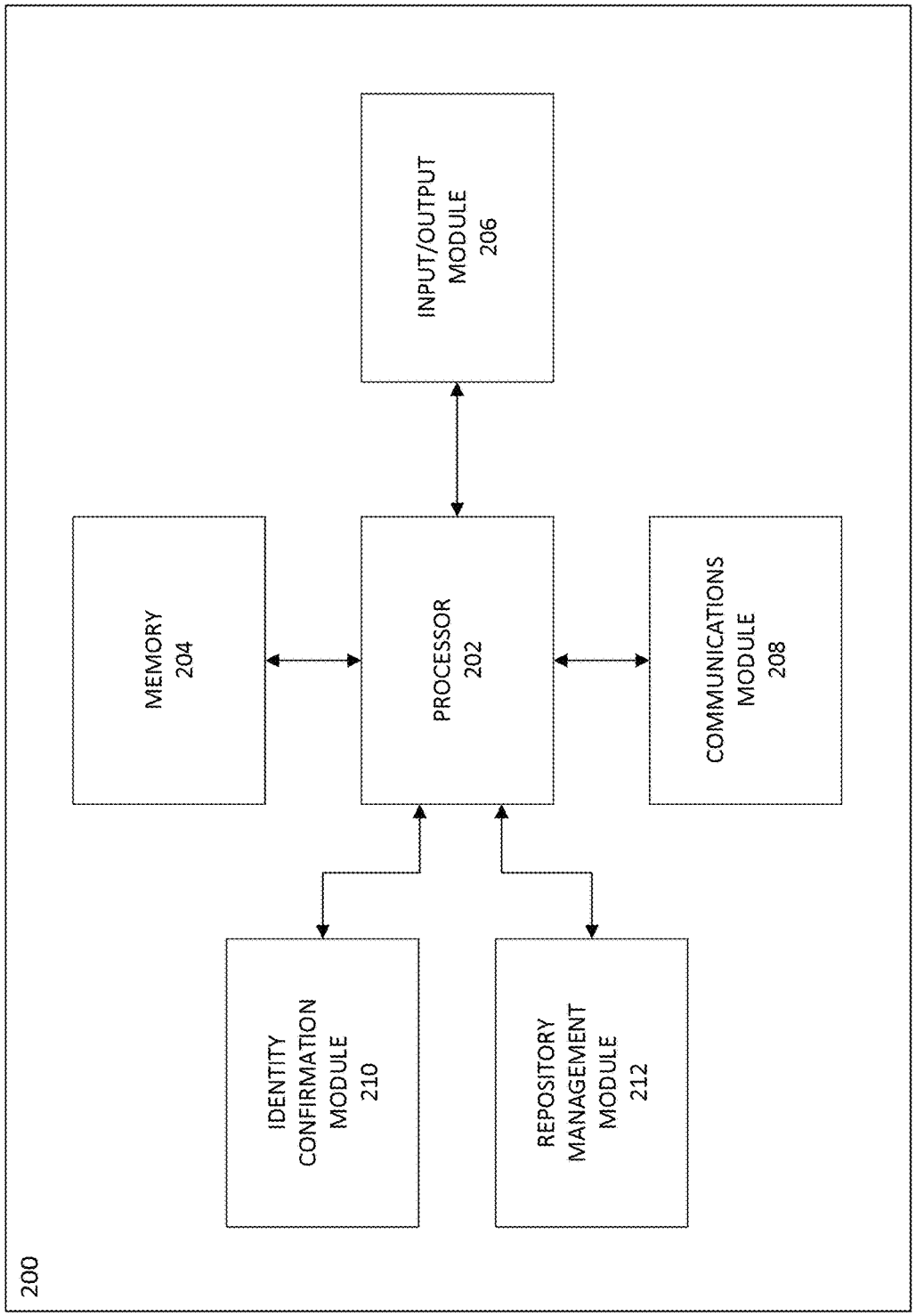
Figure 3:
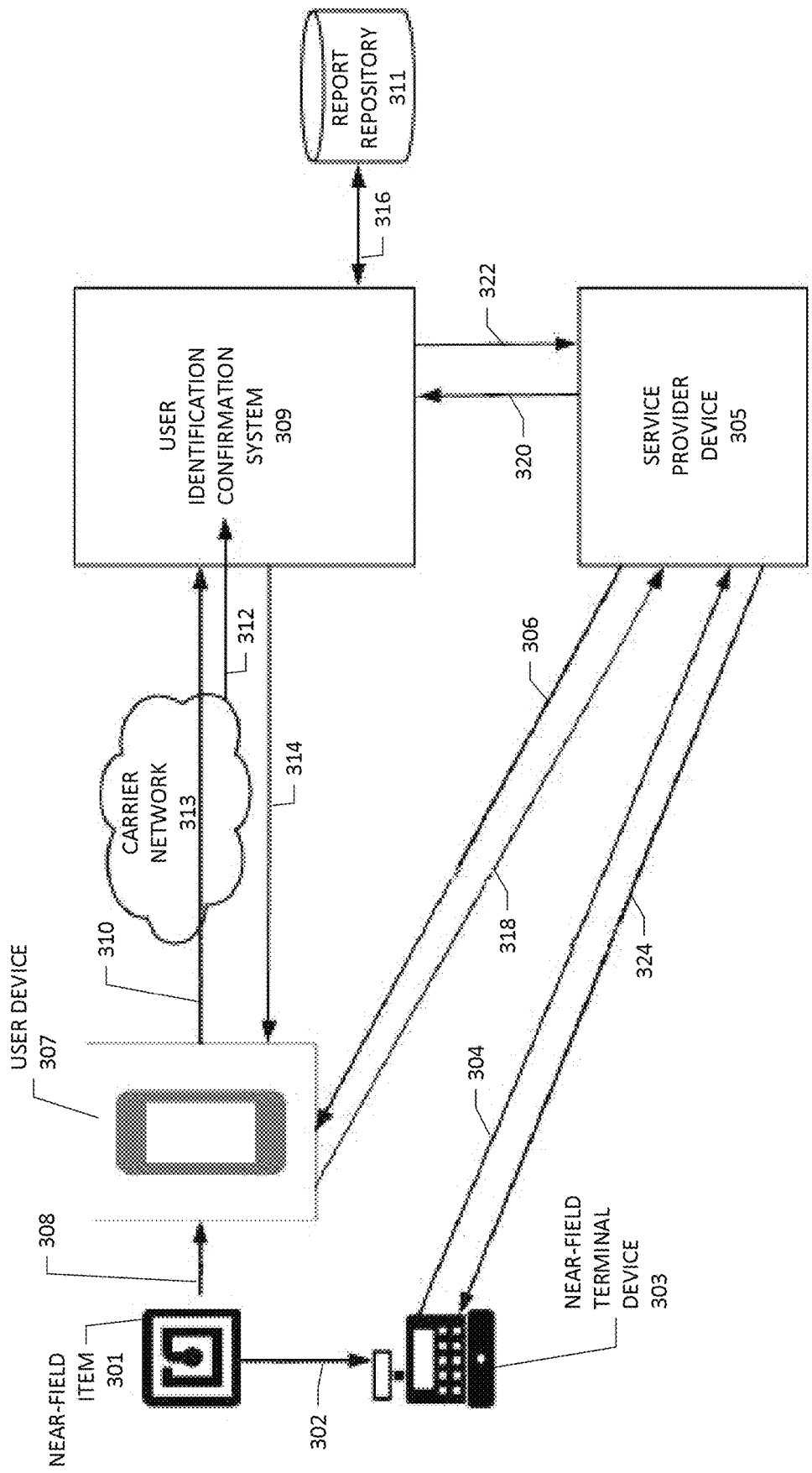
Figure 4:
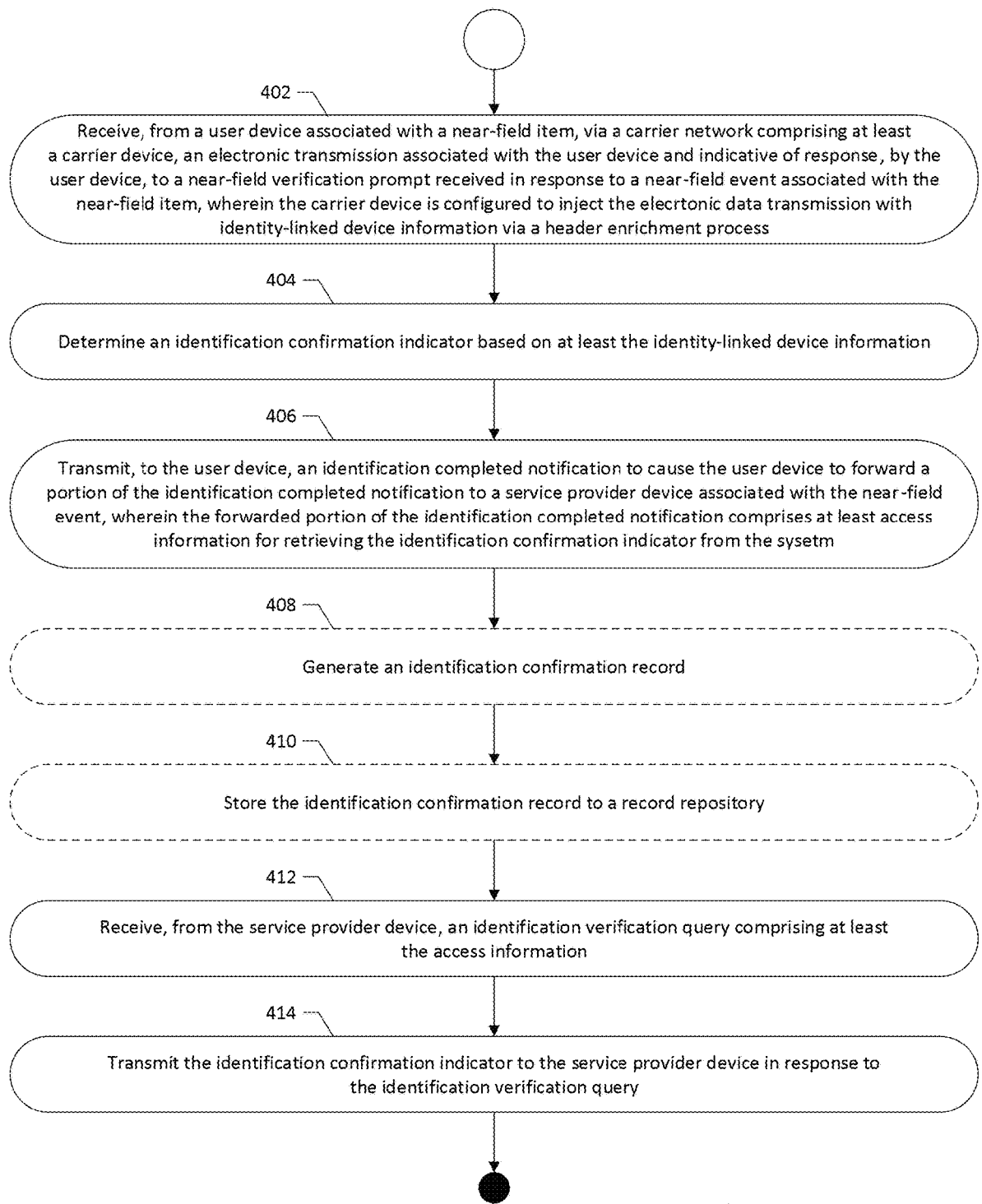
Figure 5:
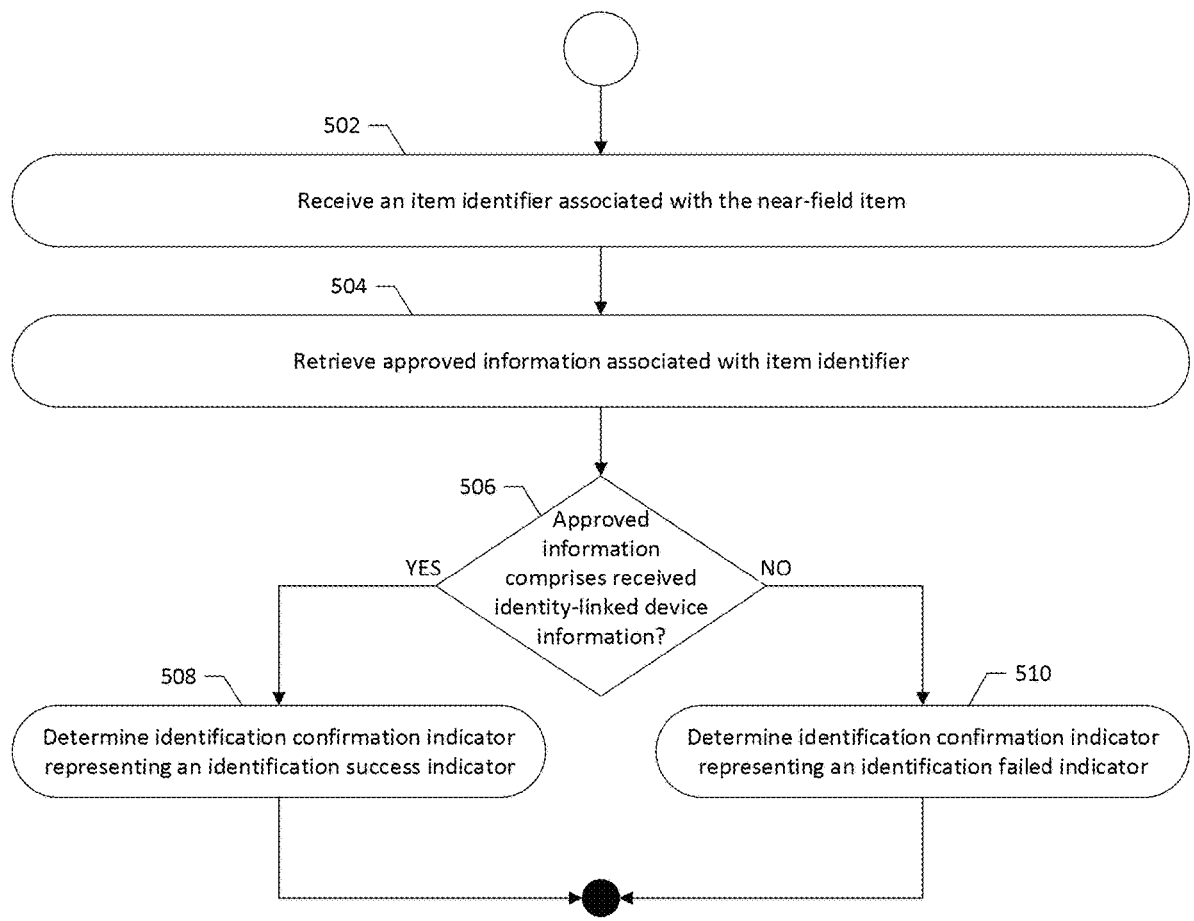

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example apparatus that may be specially configured in accordance with an example embodiment of the present disclosure;

FIG. 3 illustrates a data flow diagram depicting example data flow interactions between devices in accordance with an example embodiment of the present disclosure;

FIG. 4 illustrates a flowchart depicting various operations performed in an example process for identification and confirmation of a user entity associated with a near-field item, for example to facilitate near-field events and/or corresponding services, in accordance with example embodiments of the present disclosure; and FIG. 5 illustrates a flowchart depicting various operations performed in an example process for determining an identification confirmation indicator, in accordance with some embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein. Rather, these embodiments are provided so that this disclosure will satisfy applicable legal requirements. Like numbers refer to like elements throughout.

Overview

Near-field communications enables close proximity data transmission from a near-field item to a near-field terminal device. The near-field item may be a small, passive data store. The small portfolio associated with a near-field item allows the near-field item to be embedded in a variety of objects and/or items, such as payment cards (e.g., credit or debit cards), keycards, wearable items, jewelry, wearable devices, mobile devices, products, product packaging, and the like.

The near-field item may be accessed and/or read by a near-field terminal device reads during a near-field event (e.g., during a transaction in which the near-field item is placed in close proximity to the near-field terminal device). The near-field terminal device may be associated with a service provider device that uses the stored information read from the near-field item to perform one or more applications and/or provide one or more services, including, but not limited to, user identification, user authentication, and user or item tracking. For example, near-field items may be read and the stored information may be used to perform one or more actions, such as unlocking a door, identifying an account holder for a financial transaction, meter public transit usage (e.g., checking in and out of a public transit system, such as a bus for example), and authenticate the possessor of the to grant access to a location, attraction, or the like.

However, near-field items may be read by any near-field terminal device within close proximity to it. While near-field items may be designed to communicate with near-field terminal devices only at close proximity (e.g., less than 20 centimeters between the near-field item and near-field terminal device), transmissions of stored data by a near-field item may be intercepted at a much greater distance (e.g., up to 10 meters from the near-field item). The near-field item may be vulnerable to interception by malicious users, who may modify and/or utilize the intercepted data. Near-field items may not include protection against data interception, and thus no protection against use by malicious third-party entities. Further, near-field items may be lost and/or stolen along with the corresponding object, item, product, or the like, in which the near-field item is embedded. If a malicious user entity possesses the near-field item (e.g., by possessing the item, object, product, packaging, or the like, in which the near-field item is embedded), the malicious user may utilize the near-field item in one or more near-field events without authorization by the rightful user entity.

Embodiments of the present disclosure utilize identity-linked device information associated with a particular user device that is further associated with a particular near-field item for improved out-of-band identification and confirmation of a user entity associated with the near-field item. Upon receiving a trusted user entity identification and/or authentication, a service provider device may authorize use of the near-field item in a near-field event. For example, upon confirming the identity of the user entity associated with the near-field item using trusted identity-linked device information in an out-of-band user identification and/or confirmation, a service provider device may authorize a transaction and/or other service associated with the use of the near-field item.

Embodiments confirm the identity of a user entity associated with a near-field item and/or associated user device by confirming the identity-linked device information associated with the associated user device, for example via a user identification confirmation system. Identity-linked device information may be identifying information associated with the user entity that is received via a highly secure process from a trusted entity in response to a transmission by a corresponding user device. For example, in some embodiments, identity-linked device information comprises a mobile phone number associated with a mobile phone, which may be received from a carrier device associated with the carrier network for the mobile phone, via a secure process such as header enrichment. The header enrichment process is highly secure, as it is utilized by the carrier entity to bill the user entity associated with the mobile phone, and leverages the security of the SIM associated with the mobile device Similarly, other highly secure processes may be utilized, such as signaling by a carrier device associated with the carrier entity of information used among carriers for routing calls and/or for determining roaming.

Identity-linked device information associated with a user device serves as a proxy for the identity of the user entity in possession or control of the user device. In this way, the identity-linked device information received is highly trustworthy as associated with the user device that initiated a transmission, for example by transmitting an electronic data transmission to a user identification confirmation system. For example, user devices such as mobile phones have become as ubiquitous as a wallet or purse. Mobile phones are typically kept in close proximity to the user entity that rightfully owns and/or controls the mobile phone, and under the control of the rightful user entity. In the event that a mobile phone is lost or stolen, the mobile phone is typically protected by a numeric passcode, pattern passcode, fingerprint and/or other biometric characteristic, or other mechanism such that only the rightful owner may access the mobile phone to perform actions via the mobile phone. Additionally, even if the mobile phone is replaced, the phone number often remains the same between devices. Thus, confirming that a user entity had access to a mobile phone associated with a corresponding mobile phone number serves as a proxy for confirming the identity of the user entity.

Embodiments confirm the identity of the user entity associated with a user device using the identity-linked device information received associated with the user device. The user device may be associated with a near-field item, for example where certain identity-linked device information is white-listed as permissioned to perform transactions and/or other near-field events via the near-field item. In some embodiments, the user identification confirmation system maintains, and/or accesses, approved information representing a mapping between near-field a items identifier and one or more identity-linked device information for user devices approved to perform near-field events using the near-field item associated with the near-field identifier. For example, a user may white-list one or more particular phone number, such that a service provider device may perform a transaction and/or continue a near-field event upon receiving an identification confirmation indicator from a user identification confirmation system that represents the user entity was successfully authenticated as associated with, or otherwise permissioned or white-listed to use, the near-field item.

In embodiments of the present disclosure, once user entity identification and confirmation/authentication is completed, a user identification confirmation system may determine an identification confirmation indicator that represents whether the received identity-linked device information associated with a user device is permissioned to use the near-field item. The identification confirmation indicator may be transmitted to the service provider device, for example after in response to requesting by the service provider device, to cause the service provider device to proceed accordingly. For example, in some embodiments, in a circumstance where the identification confirmation indicator represents an identification success indicator, the service provider device may continue a transaction, and/or provide a service associated with the near-field event between a near-field terminal device associated with the service provider device, and the near-field item associated with the user device. In a circumstance where the identification confirmation indicator represents an identification failed indicator, the service provider device may terminate the transaction. In so doing, embodiments of the present disclosure address the technical problems associated with ensuring near-field items are utilized by approved user entities, and enable service provider devices to confirm the identity of a user entity associated with a near-field item for a particular near-field event before providing a service associated with the near-field event (e.g., logging in a user, completing a financial transaction, granting access to a physical location, or the like).

Definitions

The term "user device" refers to hardware and/or software that is configured to interact with a service provider device and a user identification confirmation system. In some embodiments, a user device interacts with a service provider device and/or user identification confirmation system via one or more networks. User devices may include any known computing devices such as, without limitation, mobile phones, smart phones, tablet computers, wearables, personal computers, enterprise computers, and the like.

The terms "user entity" and "user" refer to an individual, corporation, group, or other entity associated with and/or in control of a particular user device. An example of a user entity is, without limitation, a mobile phone owner.

The term "identity-linked device information" refers to information associated with a user device that functions as a proxy for identification of the user entity associated with the user device. In some embodiments, identity-linked device information is injected into a transmission from a user device to a user identification confirmation system by a carrier device associated with a carrier network, or another trusted third-party device or system. In some embodiments, identity-linked device information comprises a phone number in plaintext or hashed format.

The term "carrier network" refers to a telecoms network infrastructure provided by a telecoms service provider ("carrier") for communication between one or more devices, systems, or apparatuses. In some embodiments, a user device is configured to communicate with a user identification confirmation system via a carrier network associated with a carrier entity facilitating communication services for the user device. In some embodiments, a carrier network comprises one or more carrier devices. A carrier network may be an out-of-band network with respect to another network, such as a Wi-Fi network.

The term "carrier device" refers to hardware, software, and/or a combination thereof, embodying a component of a carrier network. In some embodiments, a carrier device is a server or network infrastructure for transmitting information. In some embodiments, one or more carrier devices is configured to perform header enrichment to inject identity-linked device information into electronic data transmissions from a user device. In some embodiments, the carrier device is a server controlled by a carrier entity.

The terms "carrier header enrichment," "packet header enrichment," and "header enrichment process" refer to a process for authenticating a mobile device or an owner of the mobile device via a Direct Autonomous Authentication process, involving a packet header enrichment in which packet headers comprise device identification information, for example, "injected" therein by a trusted party, such as a carrier via a carrier device, network provider or through a login process. For example, in some embodiments, a network may inject a mobile phone number associated with a mobile device within packet headers of a transmission. In this manner, the device-identity management system may obtain device-identity information associated with a user device and associated with the user of the user device without user input. Application Ser. No. 15/424,595, entitled "Method and Apparatus for Facilitating Frictionless Two-Factor Authentication," filed on Feb. 3, 2017, which is hereby incorporated by reference in its entirety, describes a number of exemplary processes for performing a Direct Autonomous Authentication process.

The term "service provider device" refers to hardware and/or software that is configured to provide one or more services to a user device. In some embodiments, a service provider device is configured to identify a user entity associated with a user device by communicating with a user identification confirmation system. A service provider device interacts with, or interfaces with, one or more user devices and/or a user identification confirmation system via one or more networks. A service provider device may include any known computing devices, including, without limitation, servers, mobile terminals, personal computers, enterprise computers, and the like, or a combination thereof.

The term "service provider entity" refers to an individual, corporation, group, or other entity associated with and/or in control of a particular service provider device. A service provider entity enables the provision of services to user entities via one or more service provider device(s) communicable with one or more user device(s).

The term "user identification confirmation system" refers to hardware, software, or a combination thereof, for verifying a user identity associated with a user device using identity-linked device information. In some embodiments, a user identification confirmation system includes a carrier device for performing a header enrichment process. In some embodiments, a user identification confirmation system is configured to store user information associated with the identity-linked device information. In some embodiments, a user identification confirmation system is configured to communicate with one or more user devices and/or service provider devices via one or more networks. In some embodiments, a user identification confirmation system is configured to communicate with a user device via a first network (e.g., a carrier network) and a service provider device via a second network (e.g., the Internet over a Wi-Fi network).

The user identification confirmation system may be associated with an application, such as a software application or web application, configured to be executed by a user entity via a user device. The user entity may be associated with a user account managed by the user identification confirmation system. The user account may be associated with (1) identity-linked device information associated with the user entity, (2) approved near-field items associated with the identity-linked device information, and/or (3) additional user information stored for completing one or more transactions in response to successful user identification and/or authentication using identity-linked device information.

The term "access link" refers to a predefined URI, and/or corresponding interface component, configured to facilitate transmission of an electronic data transmission from a user device to a user identification confirmation system. In some embodiments, an access link is configured to terminate at a carrier device within a carrier network, where the carrier device is configured to perform a header enrichment process and forward the electronic data transmission identity-linked device information to the user identification confirmation system in response to engagement with the access link. In other embodiments, an access link is configured to terminate at a carrier device within a user identification confirmation system, such that the carrier device may perform a header enrichment process and be accessed by the user identification confirmation system without forwarding the electronic data transmission. In some embodiments, an access link comprises a redirect link configured to automatically cause engagement of the access link and transmitting of an electronic data transmission. In some embodiments, the access link comprises a HTTP or HTTPS GET request.

The term "near-field verification prompt" refers to information, data, or a request transmitted from a service provider device to a user device in response to a near-field event associated with a near-field item, where the near-field verification prompt indicates a request for the user entity associated with the user device to confirm their identity via communication with the user identification confirmation system. A near-field verification prompt includes information, such as an access link, for communicating with the user identification confirmation system. In some embodiments, the user device renders a corresponding interface to the user device for accessing the user identification confirmation system in response to the near-field verification prompt. For example, a user device may render a near-field verification prompt interface comprising at least an access link for communicating with the user identification confirmation system in response to user engagement with the access link.

The term "electronic data transmission refers to an electronically managed information package for transmission from a user device to a user identification confirmation system over a carrier network. In some embodiments, the electronic data transmission is transmitted to a carrier device configured to perform a header enrichment process and forward the electronic data transmission including the injected identity-linked device information to the user identification confirmation system.

The term "near-field item" refers to an circuitry, a microchip, or other hardware and/or software configured to store data, and/or enable the transmission of data from the near-field item to the near-field terminal device, and in some embodiments from the near-field terminal device to the near-field item. In some embodiments, a near-field item is integrated with an object or item, including, for example, without limitation, an electronic device (e.g., a smartphone device or laptop device), wearable device, wristband or jewelry item, sticker, or card. Non-limiting examples of a near-field item includes an NFC, RFID tag, or other close proximity range device, which may be integrated into an object or item, such as a phone or a wristband. In some embodiments, a near-field item may utilize active tagging and/or passive tagging technologies, such that the near-field item may be utilized in a near-field event when brought into close proximity with a near-field terminal device.

The term "item identifier" refers to a numerical string, alphanumeric string, number, or other unique value that uniquely identifies a near-field item. In some embodiments, a near field item is configured to store its item identifier, such that the near-field item may communicate the item identifier to a near-field terminal device when communicating (e.g., during a near-field event).

The term "near-field terminal device" refers to hardware and/or software configured to communicate in close proximity with a near-field item to perform a near-field event. A near-field terminal device is associated with a service provider device for facilitating one or more services to the user entity associated with the near-field item. Examples of near-field terminal devices include user authentication terminals, payment processing terminals, and the like. A near-field terminal device is configured to transmit data to a service provider device, for example information read from a near-field item during a near-field event. Additionally, in some embodiments, a near-field terminal device is configured to receive data from the service provider device. In some embodiments, a near-field terminal device is configured using active tagging or passive tagging.

The term "near-field event" refers to communication between a near-field terminal device and a near-field item. A near-field event occurs when a near-field item is brought into close proximity with a near-field terminal device. In some embodiments, a near-field event is associated with a transaction between a user entity associated with a near-field item and/or user device, and a service provider entity associated with a near-field terminal device communicating with the near-field item.

The term "identification confirmation indicator" refers to a data value and/or object representing a determination by the user identification confirmation system as to whether the identity of a user entity associated with a user device was successfully confirmed. In some embodiments, a user identification confirmation system generates and/or determines an identification confirmation indicator based on identity-linked device information received from the user device via a header enrichment process, and service provider expected user device identity information. For example, in some embodiments, the electronic data transmission may include an expected phone number from the service provider device (e.g., a phone number stored by the service provider device associated with a particular near-field item), and identity-linked device information embodied by a phone number injected via a header enrichment process. In other embodiments, the user identification confirmation system may be configured to retrieve stored expected identification data for comparison to received identity-linked device information. The identification confirmation indicator may represent an identification success indicator in a circumstance where the expected identification data and the identity-linked device information match, and an identification failed indicator in a circumstance where the expected identification data does not match.

The term "identification confirmation record" refers to a data object configured for summarizing information associated with receiving of an electronic data transmission in response to a near-field verification prompt received from a service provider device in response to a near-field event between a near-field item and a near-field terminal device associated with the service provider device. In some embodiments, the identification confirmation record includes at least the received identity-linked device information, and the determined identification confirmation indicator. In some embodiments, the identification confirmation record additionally includes a service provider identifier that uniquely identifies the service provider device associated with the near-field event. Additionally or alternatively, in some embodiments, the identification confirmation includes an item identifier associated with the near-field item associated with the near-field event.

The term "approved information" refers to stored identification information associated with near-field items approved for use associated with identity-linked device information of a particular user device. For example, a user may link a near-field item with identity-linked device information (or a corresponding user account managed by the user identification confirmation system), such that transactions involving the near-field item may be approved by the user identification confirmation system. The user identification confirmation system may store, for each identity-linked device information, one or more approved (or in other words whitelisted) near field items.

The term "identification completed notification" refers to information or a transmission generated and/or transmitted from a user identification confirmation system to a user device in response to determining an identification confirmation indicator. The identification completed notification may include access information that enables a service provider device to access the user identification confirmation system and receive the identification confirmation indicator. In some embodiments, the identification completed notification is configured to cause the user device to forward the identification completed notification, or a potion thereof, to the service provider device either in response to user engagement with the identification completed notification (or a corresponding interface), or automatically.

The term "access information" refers to data and/or information for associating a particular identification confirmation indicator with a particular user device and/or service provider device. In some embodiments, access information comprises an access identifier that uniquely is configured for use in retrieving the identification confirmation indicator from the user identification confirmation system. In some embodiments, access information comprises a session identifier created by the service provider device, created by the user device and forwarded to the service provider device, or created by the user identification confirmation system and forwarded to the service provider device (for example via the user device).

The term "identification verification query" refers to a transmission, received by the user identification confirmation system from a service provider device, requesting retrieval of an identification confirmation indicator. In some embodiments, an identification verification query comprises at least access information for retrieving a desired identification confirmation indicator (e.g., associated with a user device the service provider device caused to communicate with the user identification confirmation system for identification and authentication).

Example System Architecture and Example Apparatus

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a number of mobile terminals, mobile telephones, smartphones, laptop computers, tablet computers, or any combination of the aforementioned devices.

In this regard, FIG. 1 illustrates an example computing system in which embodiments of the present disclosure may operate. FIG. 1 illustrates an overview of a system configured for improved user entity identification and authentication to facilitate use of a near-field item associated with a near-field event. Specifically, identity-linked device information associated with a user device is used to identify and/or authenticate a user entity associated with the user device. The identification and authentication of the user entity may be used to provide an identification confirmation indicator to a service provider device that facilitates use of the near-field item to continue or terminate services associated with the near-field event (e.g., continue or terminate a transaction, a login process, or the like).

The system includes user identification confirmation system 102, user device 104, service provider device 106, near-field item 108, and near-field terminal device 110. The system includes communication network 114 and carrier network 112, for communication between the various devices, sub-systems, or components of the system. In other embodiments, the system may be associated with multiple user devices, multiple service provider devices, multiple near-field items, and/or multiple near-field terminal devices.

User device 104 may be configured to communicate with the user identification confirmation system 102 and service provider device 106 via the carrier network 112. The carrier network 112 may include one or more carrier device(s) (not shown). In some embodiments, a carrier device associated with the carrier network 112 is configured to perform one or more secure processes for injecting identity-linked device information into transmissions from the user device 104. For example, in some embodiments, the carrier device may be configured to perform a header enrichment process that utilizes a secured carrier method of identifying the user device for billing purposes (e.g., by leveraging SIM technology associated with the user device).

In some embodiments, carrier network 112 includes at least one carrier device which may be within the user identification confirmation system 102. Accordingly, the user identification confirmation system 102 may access the carrier device to information, such as an electronic data transmission, without forwarding by the carrier device. In other embodiments, carrier network 112 includes at least one carrier device that is configured to forward transmitted information (e.g., an electronic data transmission) to the user identification confirmation system 102 after injection of identity-linked device information.

The user device 104, service provider device 106, and user identification confirmation system 102 may communicate with one another via communication network 114. The communication network 114 may be configured, for example, to at least facilitate communication between a service provider device 106 and the user identification confirmation system 102, or between a service provider device 106 and user device 104. In some embodiments, the communication network 114 may be embodied by any known network configurations, including Wi-Fi networks, LAN networks, WLAN networks, and the like, comprised of any number of known network devices.

The carrier network 112 may be an out-of-band network with respect to the communication network 114. In this regard, in some embodiments, the carrier network 112 may not share any components with the communication network 114. In other embodiments, the carrier network 112 may share some, but not all, components with the communication network 114. In this regard, the user device 104 may communicate with the service provider device 106 over the communication network 114, and the user identification confirmation system 102 over the carrier network 112 to prevent channel-based cyber-attacks.

The user device 104 may be associated with any number of known computing devices. For example, the user device 104 may be embodied by a mobile phone, smart phone, tablet, laptop, personal computer, wearable device, set-top box, internet-of-things enabled device (IoT device), or the like. The user device 104 may be associated with a user entity that rightfully owns, possesses, or otherwise controls the user device 104. The user device 104 may be secured with one or more user security verification processes (e.g., passcodes, fingerprint and/or other biometric scanning, or the like).

The user device 104 may include, or otherwise be associated with, the near-field item 108. Near-field item 108 may be, for example, a NFC tag or a RFID tag. In some embodiments, the near-field item 108 is embedded in the user device 104. In other embodiments, the near-field item is embodied in another object, item, product, packaging, or the like associated with the user device 104. For example, the near-field item may be embodied by a credit or debit card associated with the user entity associated with the user device 104.

In some embodiments the user device 104 is configured to read the near-field item 108. For example, the user device 104 may be configured to operate as a second near-field terminal device, such that stored information may be read from the near-field item 108. For example, in some embodiments, the user device 104 may be required to perform a near-field event with the near-field item 108 to confirm the user device 104 is in close proximity with the near-field item 108.

The near-field terminal device 110 may comprise hardware, software, or a combination thereof, for reading from and/or otherwise communicating with the near-field item 108. A near-field terminal device 110 may read from the near-field item 108 when the near-field item 108 is brought into close proximity for performing a near-field event. The near-field terminal device 110 may comprise any known number of NFC terminals, including active and/or passive devices. In some embodiments, the near-field terminal device 110 be embodied as a fixed system or device. The near-field terminal device 110 may be configured to communicate using any number of known near-field communication protocols.

The service provider device 106 may be one or more computing devices operated by a third-party entity with respect to the user identification confirmation system 102 and user device 104. The service provider device 106 may be configured to provide one or more servers to user entities, for example financial transactions, location access services (e.g., unlocking doors, granting access to an attraction, or the like), access to one or more services hosted by and/or otherwise provided via the service provider device 106 (e.g., logging into a particular digital service offered by the service provider device). The service provider device 106 may be one or more remote servers configured to receive a request for services, authenticate the user associated with the request for services (e.g., by communicating with a user identification confirmation system), and, in a circumstance where authenticated, provide particular information, a particular product, offering, service, software, or the like, for example to the user entity associated with the user device 104).

The service provider device 106 may be associated with the near-field terminal device 110. The service provider device 106 may, for example, receive stored information associated with the near-field item 108 from the near-field terminal device 110, for example in response to a near-field event between the near-field item 108 and near-field terminal device 110. The near-field event may represent, or be associated with, a request for services from the service provider device 106. For example, the service provider device 106 may provide one or more purchasable products and/or services, and the service provider device 106 may receive, via the near-field terminal device 110 a payment transaction request associated with a near-field event between the near-field terminal device 110 and near-field item 108 (e.g., where a user entity brings the near-field item 108 close to the near-field terminal device to facilitate payment). In some embodiments, the near-field terminal device 110 communicates with the service provider device 106 via the communication network 114.

The user identification confirmation system 102 may be one or more computing apparatuses, devices, or the like, configured for identification and confirmation of a user entity associated with a near-field item, such as near-field item 108, for providing services in response to near-field events associated with the near-field item. The user identification confirmation system 102 may include at least a server.

The server may be embodied by as a computer or computers known in the art. The server may provide for receiving identity-linked device information from the user device. For example, the server may be operable to receive identity-linked device information as part of an electronic data transmission from the user device 104 over the carrier network 112, for example via header enrichment process.

The server may further provide for performing one or more determinations based on received and/or retrieved information. For example, the server may be operable to determine an identification confirmation indicator based on at least the received identity-linked device information. The server may be configured, using hardware, software, or a combination thereof, to perform these determinations.

The server may further provide for communicating with the user device 104 and/or service provider device 106. For example, the server may facilitate receiving an electronic data transmission from the user device 104. Further, the server may facilitate transmitting an identification completed notification to the user device 104, for example in response to the received electronic data transmission. The identification completed notification may comprise, or otherwise embody, a redirect link configured for automatically causing the user device 104 to transmit a portion of the identification completed notification to the service provider device 106. The server may further be configured for receiving an identification verification query from the service provider device 106, and transmitting an identification confirmation indicator in response.

The user identification confirmation system 102 may further comprise at least one repository. The repository may be configured for storing, maintaining, and/or retrieving various information utilized for identification and confirmation of a user entity associated with a near-field item. For example, the repository may store at least one or more selected from the group of: identity-linked device information, approved information, access information, identification confirmation indicator(s), and the like. In some embodiments, the repository may comprise multiple sub-repositories. For example, in some embodiments, each type of information may be stored in a particular sub-repository. It should be appreciated that the repository may include any number of sub-repositories, tables, and/or other configurations.

The repository may be embodied as a data storage device, such as or more network attached storage (NAS) device(s), or a separate database server or servers. The repository may include information received by, accessed, by, or otherwise obtained by the server of the user identification confirmation system 102. The user identification confirmation system 102 may extract and/or parsed received transmissions, requests, or the like to extract information for storage to the repository.

User identification confirmation system 102 may be embodied by one or more computing systems, devices, or apparatuses, such as the apparatus 200 shown in FIG. 2. As illustrated, the apparatus 200 may include a processor 202, a memory 204, an input/output module 206, communications module 208, identity confirmation module 210, and repository management module 212. The apparatus 200 may be configured, using means such as the components 202-212, to perform the operations described herein. Although these components 202-212 are described with respect to functional limitations, it should be understood that a particular implementation necessarily includes the use of particular hardware. I should also be understood that certain of these components 202-212 may include similar or common hardware. For example, two modules, components, or sets of components may both leverage use of the same processor, network, interface, storage medium, and/or the like, to perform their associated functions, such that duplicate hardware is not required for each module. The user of the terms "module" and "circuitry" as used herein with respect to the components of the apparatus 200 should therefore be understood to include particular hardware configured to perform the functions associated with the particular component as described herein.

Indeed, the terms "module" and "circuitry" should be understood broadly to include hardware and, in some embodiments, software and/or firmware for configuring the hardware. For example, in some embodiments, the term "module" may include processing circuitry, storage medium(s), network interface(s), input/output device(s), and the like. In some embodiments, some modules of the apparatus 200 may provide or supplement the functionality of another particular module or multiple modules. For example, the processor 202 may provide processing functionality, the memory 204 may provide storage functionality, the communications module 208 may provide network interface functionality, and the like. In some embodiments, the processor 202 (and/or co-processor and any other processing module assisting or otherwise associated with the processor) may be in communication with the memory 204 via a bus for passing information among components of the apparatus 200. The memory 204 may be non-transitory and include, for example, one or more volatile and/or non-volatile memories. In other words, for example, the memory 204 may be an electronic storage device (e.g., a computer readable storage medium). The memory 204 may be configured to store information, data, content, applications, instructions, or the like, for enabling the apparatus to carry out various functions in accordance with example embodiments of the present disclosure.

The processor 202 may be enabled in a number of different ways and may, for example, include one or more processing devices configured to perform independently. Additionally or alternatively, the processor may include one or more processors configured in tandem with a bus to enable independent execution of instructions, pipelining, and/or multi-threading. The use of the terms "processor," "processing module," and "processing circuitry" may be understood to include a single core processor, a multi-core processor, multiple processors internal to the apparatus, and/or remote or "cloud" processors.

In an example embodiment, the processor 202 may be configured to execute instructions stored in the memory 204, or otherwise accessible to the processor. Additionally or alternatively, the processor may be configured to execute hard-coded functionality. As such, whether configured by hardware methods, software methods, or a combination thereof, the processor may represent an entity (e.g., physically embodied in the circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output module 206 that may, in turn, be in communication with processor 202 to provide output to the user and, in some embodiments, to receive an indication of a user input. The input/output module 206 may comprise a user interface, which may include a display controlled by or associated with a web interface, a mobile application, and/or another user interface, or the like. In some embodiments, the input/output module 206 may include a keyboard, a mouse, a touch screen, touch areas, soft keys, a microphone, a speaker, or other input/output mechanisms. The processor and/or user interface module comprising the processor may be configured to control one or more elements of a user interface through computer program instructions (e.g., software and/or firmware) stored on a memory accessible to the processor such as memory 204 and/or the like.

The communications module 208 may be any means, such as a device, module, and/or circuitry, embodied in either hardware or a combination of hardware and software, that is configured to receive and/or transmit data from and/or to another device, module, circuitry, or the like in combination with the apparatus 200. The communications module 208 may include means to communicate with remote devices (such as the user device 104 and/or service provider device 106) via one or more networks. In this regard, the communications module 208 may include, for example, one or more network interfaces for enabling communications with one or more wired or wireless communication networks. For example, the communications module 208 may include one or more network interface cards, antennas, buses, switches, routers, modems, and supporting hardware and/or software, or any other device suitable for enabling communications via a network (or multiple networks). Additionally or alternatively, the communications module 208 may include a communications interface including circuitry for interacting with the antenna(s) to cause transmission of signals via the antenna(s) or to handle receipt of signals via the antenna(s).

The identity confirmation module 210 includes hardware, software, or a combination thereof, for identifying a user entity associated with identity-linked device information and/or authenticating a user entity receiving electronic data transmissions from a user device (for example, including identity-linked device information), manipulating information received (for example, including identity-linked device information), performing one or more determinations associated with received and/or retrieved information. For example, identity confirmation module 210 may be configured to determine an identification confirmation indicator based on, at least, received identity-linked device information. Additionally or alternatively, in some embodiments, the identity confirmation module 210 may include hardware, software, or a combination thereof for generating and/or storing an identity confirmation record based on the identification confirmation indicator (e.g., which summarizes the determination as to whether the identity-linked device information identifies a particular user entity and/or is authenticated to utilize a corresponding near-field item). In some embodiments, the identity confirmation module 210 may include a separate processor, specially configured field programmable gate array (FPGA), or application specific interface circuit (ASIC). The identity confirmation module 210 is configured to perform one or more additional and/or alternative functions, and/or partial operations or whole operations described with respect to the other modules as illustrated.

The repository management module 212 includes hardware, software, or a combination thereof, for storing, retrieving, and/or manipulating stored information in one or more databases and/or repositories. In some embodiments, repository management module 212 may be configured to store, retrieve, and maintain identity-linked device information in a repository. The repository management module 212 may store identity-linked device information associated with one or more item identifiers permissioned or otherwise whitelisted to utilize the near-field item associated with each item identifier. Additionally or alternatively, the repository management module 212 may store an item identifier associated with approved information, for example identity-linked device information approved to utilize the near-field item associated with the item identifier. In some embodiments, the repository management module 212 may store approved information (e.g., one or more approved identity-linked device information for a particular item identifier, and/or one or more approved item identifier(s) for particular identity-linked device information). The repository management module 212 may generate, store, retrieve, and/or otherwise maintain one or more identification confirmation record(s) in a repository, such as a record repository. The repository management module 212 may maintain one or more blockchain repositories, for example, for storing identification confirmation records. The repository management module 212 may include a separate processor, specially configured field programmable gate array (FPGA), or application specific interface circuit (ASIC). The repository management module 212 is configured for implementing at least these planned functions, and in some embodiments, may perform additional and/or alternative functions, and/or partial operations or whole operations described herein with respect to other modules as illustrated.

It should be appreciated that one or more of the modules 202-212 may be combined to form one module that performs the function of multiple modules. In some embodiments, for example, each of the modules 210-212 may be embodied entirely in one or several software modules for execution in conjunction with the processor 202 and memory 204.

As will be appreciated, any such computer program instructions and/or other type of code may be loaded onto a computer, processor, and/or other programmable apparatus' circuitry to produce a machine, such that the computer, processor, or other programmable circuitry that executes the code on the machine creates the means for implementing various functions, including those described herein. For example, in some embodiments, one or more of the modules may be entirely embodied by one or more software modules for performing the functions identified.

As described above, and as will be appreciated based on the disclosure, embodiments of the present disclosure may be configured as methods, mobile devices, backend network devices, and the like. Accordingly, embodiments may comprise various means embodied by entirely hardware, entirely software, or a combination of hardware and software. Further, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, flash memory, CD-ROMs, optical storage devices, magnetic storage devices, or the like.

Example Data Flow

Having thus described an example system and apparatus, an example data flow will now be described. It will be appreciated that the described data flows, operations, processes, and the like are non-limiting examples, and embodiments may perform various data flows in a myriad of ways using various system configurations.

FIG. 3 illustrates a data flow diagram depicting operations for identification and confirmation of a user entity associated with a near-field item. Specifically, the data flow diagram illustrates operations for confirming a user identity associated with near-field item 301, by using a user identification confirmation system 309, to determine whether the use entity may receive services from service provider device 305 in response to a near field event associated with near-field terminal device 303.

At step 302, the near-field item 301 is engaged with the near-field terminal device 303 associated with a near-field event. In some embodiments, the near-field event begins when the near-field item 301 is brought within a defined range of the near-field terminal device 303. For example, a user entity in control of the near-field item 301 may bring the near-field item 301 close to the near-field terminal device 303 associated with a particular transaction.

At step 302, some or all of the stored information managed by the near-field item 301 may be read by, or otherwise be transferred to, the near-field terminal device 303. In some embodiments, the stored information may include at least an item identifier. Additionally or alternatively, the stored information may include data utilized to complete one or more transactions, or for use in verifying a user identity. For example, in some embodiments, the stored information may include payment information, identification information, a phone number, or the like.

At step 304, the near-field terminal device 303 transfers some or all of the stored data received from the near-field item 301 to the service provider device 305. The service provider device 305 may be configured for providing one or more services to a user entity, such as a user entity associated with the near-field item 301 and/or user device 307. For example, the service provider device 305 may provide financial transaction services (e.g., purchasing one or more products, services, or the like), digital services (e.g., access to one or more websites and/or applications managed by the service provider device 305), or the like. The service provider device 305 may be associated with a service provider entity that controls and/or manages the service provider device 305.

At step 306, the service provider device 305 initiates a near-field verification prompt and causes the near-field verification prompt to appear on the user device 307. The near-field verification prompt may indicate a desire to confirm the identification of a user associated with the near-field item 301. In some embodiments, the service provider device 305 generates a near-field verification prompt associated with the near-field event and/or a service associated with the near-field event, and transmits the generated near-field verification prompt to the user device 307 to cause rendering of the near-field verification prompt (or a corresponding interface) to the user device 307. The near-field verification prompt may be used to access the user identification confirmation system 309 to perform user identification and/or authentication. For example, the near-field verification prompt may include, or be associated with, an access link. In some embodiments, the near-field verification prompt may be configured to receive user engagement for executing and/or launching the access link. In other embodiments, the user device 307 may execute and/or launch the access link immediately in response to receiving the near-field verification prompt (e.g., without requiring user input).

In some embodiments, the service provider device 305 may retrieve, from a database managed by the service provider device, user device identity information for determining a user device associated with stored information forwarded from the near-field terminal device 303. For example, a service provider device 305 may store a phone number retrievable using stored information forwarded from the near-field terminal device 303 to identify a corresponding user device to which the near-field verification prompt should be provided. In other embodiments, the service provider device 305 may store an IMEI, IP address, or another identifier to be retrievable using stored information forwarded from the near-field terminal device 303, such as an item identifier. The service provider device 305 may retrieve the stored user device identification information based on the forwarded stored information, and use the stored user device identification information to provide the near-field verification prompt to the user device 307 for rendering.

In some embodiments, the user device 307 may be associated with a phone number stored by the service provider device 305 and retrievable using stored information forwarded to the service provider device 305 from the near-field terminal device 303. The service provider device 305 may provide the near-field verification prompt to perform user entity identification and confirmation via a user identification confirmation system, such as the user identification confirmation system 309. For example, the service provider device 305 may include a retrieved phone number in the near-field verification prompt provided to the user device 307. The near-field verification prompt may then cause the user device 307 to forward the retrieved phone number perform to confirm that identity-linked device information received by the user identification confirmation system 309 (e.g., a mobile phone number transmitted via a header enrichment process) matches the phone number retrieved by the service provider device 305, thus confirming the identity of the user device 307, user entity associated with the user device 307 (by proxy), and of the near-field item 301 associated with the forwarded stored information.

In some embodiments, at optional step 308, the near-field verification prompt may cause the user device to require performance of a near-field event between the user device 307 and the near-field item 301 before the near-field verification prompt may be engaged, for example to execute and/or launch an access link included in or associated with the near-field verification prompt. For example, the near-field verification prompt may require the near-field item 301 be brought within range of the user device 307 such that the user device 307 may read the stored information from the near-field item 301. For example, in some embodiments, the near-field verification prompt may be disabled so as to not respond to user engagement and not enable execution and/or launch of the access link until performance of the near-field event between the near-field item 301 and user device 307. In response to completion of the near-field event (e.g., reading stored information from the near-field item 301 by the user device 307) the near-field verification prompt may be enabled for engagement, and/or execution and/or launch of an associated access link.

Additionally or alternatively, in some embodiments at optional step 308, the near-field verification prompt may cause the user device 307 to require an additional user acknowledgement process be performed before the near-field verification prompt may be engaged. For example, the near-field verification prompt may require the user entity to perform a biometric scan, enter a digital and/or physical passcode, or the like, via the user device 307.s The optional step 308 may be utilized, in some embodiments, to improve security associated with the overall system. For example, by requiring a near-field event be performed between the near-field item 301 and user device 307, the service provider device 305 is confident that the user device 307 may only continue if the user entity is in control of both the user device 307 and near-field item 301. Thus, the near-field event functions as an additional process in preventing completion of the user identification and confirmation process if the near-field verification prompt is intercepted and/or otherwise wrongly provided to a user device not associated with near-field item 301. Alternatively, by requiring a biometric scan, the optional step enables the service provider device 305 to be sure that the user entity accessing the user device 307 is the rightful user entity (e.g., an owner or other rightful possessor).

At step 310, the user device 307 transmits an electronic data transmission to the user identification confirmation system 309, using a secured process for including identity-linked device information in the electronic data transmission. The user device 307 may transmit the electronic data transmission in response to user engagement with the near-field verification prompt. For example, the electronic data transmission may be transmitted in response to execution and/or launch of an access link associated with the near-field verification prompt.

A myriad of secured processes for including identity-linked device information in the electronic data transmission may be used. For example, in some embodiments as illustrated, the user device 307 may transmit the electronic data transmission to the user identification confirmation system 309 over a carrier network, such as the carrier network 313. The carrier network 313 may include one or more carrier devices configured for facilitating the transmission of data from the user device 307 to the user identification confirmation system 309, and from the user identification confirmation system 309 to the user device 307.

The carrier device may be configured, at step 312, to perform a secure method for injecting identity-linked device information into the electronic data transmission. For example, the electronic data transmission may be transmitted from the user device 307 to the carrier device where the access link is configured to terminate the transmission at the carrier device. In some embodiments, the carrier device is configured to perform a header enrichment process to inject identity-linked device information associated with the user device 307 that originated the electronic data transmission, such as a mobile phone number associated with the user device 307, into the electronic data transmission. The identity-linked device information may be retrieved using the same process the carrier entity uses for billing the user entity associated with the user device 307. Such a process may rely on the inherent security of the SIM associated with the user device 307. In other embodiments, at step 312, a carrier device may be configured to utilize one or more alternative methods for injecting identity-linked device information into the electronic data transmission in a secure manner. For example, the carrier device may be configured to identify information used for routing calls from/to the user device 307, and/or determining roaming associated with the user device 307, and utilize such processes to determine identity-linked device information for including in the electronic data transmission.

In some embodiments, the carrier device may be within the carrier network and configured to forward the electronic data transmission, including the injected identity-linked device information, to the user identification confirmation system 309. In other embodiments, the carrier device may be a sub-device or sub-system within the user identification confirmation system 309. In such embodiments, the user identification confirmation system may be configured to receive the electronic data transmission without forwarding from the carrier device.

The carrier network 313 may be out-of-band with respect to the network for communication between the user device 307 and service provider device 305. For example, the service provider device 305 and user device 307 may communicate over a Wi-Fi, WLAN, LAN, or other network. In some embodiments, the network for communication between the user device 307 and service provider device 305 may include one or more components shared with the carrier network 313, and in other embodiments may include no shared components.

After step 312, the user identification confirmation system 309 receives the electronic data transmission. The user identification confirmation system 309 may then determine an identification confirmation indicator, which indicates whether the user identification confirmation system confirmed the identity-linked device information associated with the user device 307. For example, the user identification confirmation system 309 may confirm the telephone number associated with the user device 307, and received over a carrier network using a header enrichment process. In some embodiments, to determine an identification confirmation indicator, the identity-linked device information may be compared to retrieved information provided by the service provider device 305 and forwarded as part of the electronic data transmission to the user identification confirmation system 309.

In some embodiments, the user identification confirmation system 309 may associate the identification confirmation indicator with access information to enable the service provider device 305 to retrieve the identification confirmation indicator. In some embodiments, the user identification confirmation system 309 generates the access information and associates the generated access information with the identification confirmation indicator. In other embodiments, the user identification confirmation system 309 receives the access information from the user device 307, which may have been generated by the user device 307 or service provider device 305, or received from the near-field item 301 or near-field terminal device 303. In some embodiments, the access information comprises a session identifier.

In some embodiments, the user identification confirmation system 309 may store the identification confirmation indicator, for example in a database or other repository. The identification confirmation indicator may be stored associated with access information, such that the access information may be used to retrieve the corresponding identification confirmation indicator. The identification confirmation indicator may be retrieved from the database or repository at a later time, such as in response to an identification verification query.

At step 314, the user identification confirmation system 309 transmits an identification completed notification to the user device 307. The identification completed notification may indicate that the user identification confirmation system 309 has completed the identification and confirmation process, and that the identification confirmation indicator is ready to be retrieved. In some embodiments, the identification completed notification includes at least the access information for enabling the service provider device 305 to retrieve the identification confirmation indicator. In some embodiments, the user identification confirmation system 309 generates the identification completed notification.

At optional step 316, the user identification confirmation system 309 may store an identification confirmation record in a repository, such as report repository 311. The identification confirmation record may be generated by the user identification confirmation system 309. In some embodiments, the report repository 311 is a database, sub-database, or other repository managed by the user identification confirmation system 309. In other embodiments, the report repository 311 is a blockchain storage, which may be maintained by or otherwise accessible to the user identification confirmation system 309.

At step 318, the user device 307 forwards the identification completed notification, or a portion thereof, to the service provider device 305. In some embodiments, the user device 307 forwards at least the access information used for retrieving the identification confirmation indicator. In some embodiments, the user device 307 is configured to automatically forward the identification completed notification once received, for example via one or more redirect links. In other embodiments, the user device 307 may forward the identification completed notification upon user engagement, for example user input acknowledging receipt of the identification completed notification and/or permission to forward to the service provider device 305.

At step 320, the service provider device 305 transmits an identification verification query to the user identification confirmation system 309. In some embodiments, the identification verification query comprises all or a portion of the information provided via the forwarded identification completed notification. For example, in some embodiments, the identification verification query comprises at least the access information. In some embodiments, the service provider device 305 is configured to generate the identification verification query.

At step 322, the user identification confirmation system 309 transmits the identification confirmation indicator to the service provider device 305 in response to the identification verification query. In some embodiments, the user identification confirmation system 309 may parse the identification verification query to identify access information. The access information may then be used to retrieve a corresponding identification confirmation indicator. In some embodiments, the user identification confirmation system 309 may retrieve the identification confirmation indicator from a database in which the identification confirmation indicator was stored.

At step 324, the service provider device 305 may perform one or more actions based on the received identification confirmation indicator. In some embodiments, the identification confirmation indicator is embodied or represented by an identification success indicator. Accordingly, the service provider device 305 may continue to provide one or more services, for example to the user device 307 or the near-field terminal device 303. In some embodiments, for example, the service provider device 305 may transmit information to complete a transaction (such as a financial transaction) associated with the near-field event between the near-field item 301 and the near-field terminal device 303. Alternatively, in a circumstance where the identification confirmation indicator is embodied or represented by an identification failed indicator, the service provider may terminate, or otherwise fail to provide one or more services to the user device 307 or near-field terminal device 303. In some embodiments, for example, the service provider device 305 may transmit information indicating that a transaction was cancelled or failed.

The service provider device 305 may be configured to provide one or more of a myriad of services. For example, upon receiving an identification confirmation indicator, the service provider device 305 may facilitate tracking of an object associated with the near-field item, and/or all associated human handlers of the object. For example, location information may be retrieved from the user device 307 and stored associated with the object and/or item identifier, for example. The device location information may be retrieved using GPS, a device determined location process, or a carrier determined location process.

Alternatively, in some embodiments, the service provider device 305 may facilitate a financial transaction (e.g., a payment for a purchase). For example, the near-field item 301 may be associated with payment information, and the service provider device 305 may facilitate or complete the payment upon receiving an identification success indicator from the user identification confirmation system 309. In an example scenario, a user entity wearing an object (e.g., a ring, bracelet, smartwatch, or the like) with the near-field item embedded may initiate payment via a near-field terminal device 303 associated with a service provider device 305 for providing a specific product or service (e.g., a gas pump including a near-field terminal device). In other embodiments, the near-field item 301 may be embedded in a credit card, debit card, user device (such as user device 307), or other object that may be used to facilitate payment.

In other embodiments, the service provider device 305 may enable use of the near-field item for payment transactions upon receiving an identification success indicator. For example, the near-field item may be embedded in a newly received credit or debit card, which the service provider device 305 may activate upon receiving the identification success indicator indicative of receipt by an intended user entity. Additionally or alternatively, the service provider device 305 may enroll the credit or debit card for use via a mobile device-based payment system, for example Apple-Pay® or GooglePay™, associated with the user device 307. In some such embodiments, the user device 307 may include a near-field item for use in subsequent transactions, which may require user entity and confirmation, via the operational steps described above, to complete.

By only providing the services described after receiving an identification confirmation indicator, service provider devices may be sure that the services are being provided to the correct user entity and not a malicious user entity that is impersonating a legitimate near-field item. Accordingly, embodiments provide a technical solution to the technical problem of identifying and confirming the identity of a user entity associated with a particular near-field item.

In some embodiments, the system and/or operational data flow steps may differ from that illustrated in FIG. 3. For example, in some embodiments, the user identification confirmation system 309 may communicate directly with the service provider device 305 without forwarding via the user device 307. Additionally or alternatively, the data flow may include one or more alternative or additional steps, or delete steps. The specific system and operational steps illustrated in FIG. 3 are not to limit the sprit and scope of the disclosure herein.

Example Operations and Processes for
Identification and Confirmation of a User Entity
Associated with a Near-Field Item FIG. 4 illustrates an example process for identification and confirmation of a user entity associated with a near-field item, such as to facilitate near-field events and/or corresponding services, for example performed by a user identification confirmation system embodied by apparatus 200. The illustrated may be, in some embodiments, performed after performance of a near-field event between a near-field item and near-field terminal device associated with a service provider device, and providing of a near-field verification prompt to a user device based on stored information received from the near-field item and forwarded via the near-field terminal device, and engagement with the near-field verification prompt, such as execution or launching of an associated access link.

Optional operational blocks are depicted using broken/dashed lines. It should be appreciated that, in some embodiments, all of the optional blocks may be performed. In other embodiments, none of the optional blocks may be performed. Alternatively, in some embodiments, one or more, but not all, of the optional blocks may be performed. Such optional blocks should not limit the scope or spirit of the disclosure herein.

At block 402, the apparatus 200 includes means, such as identity confirmation module 210, communications module 208, processor 202, and/or the like, or a combination thereof, to receive, from a user device associated with a near-field item, via a carrier network, comprising at least a carrier device, an electronic data transmission associated with the user device and indicative of response, by user device, to a near-field verification prompt received by the user device in response to a near-field event associated with the near-field item, wherein the carrier device is configured to inject the electronic data transmission with identity-linked device information via a header enrichment process. In some embodiments, for example, the electronic data transmission may be associated with the near-field event between the near-field item and a near-field terminal device associated with a service provider device. In some embodiments, the electronic data transmission may further include at least service provider expected user device identity information retrieved by the service provider device and forwarded via the user device.

At block 404, the apparatus 200 includes means, such as identity confirmation module 210, repository management module 212, processor 202, and/or the like, or a combination thereof, to determine an identification confirmation indicator based on at least the identity-linked device information. In some embodiments, the identification confirmation indicator may be determined by comparing the identity-linked device information, injected in the electronic data transmission by a carrier device using a header enrichment process, with service provider expected user device identity information, forwarded from the service provider device and included in the electronic data transmission by the user device. The identification confirmation indicator may represent whether the identity-linked device information matches the service provider expected user device identity information. In some embodiments, in a circumstance where the identity-linked device information matches the service provider expected user device identity information, the identification confirmation indicator may be embodied or represented by an identification success indicator. In a circumstance where the identity-linked device information does not match the service provider expected user device identity information, the identification confirmation indicator may be embodied or represented by an identification failed indicator. In some embodiments, the identification confirmation indicator may be stored, for example associated with access information used to retrieve the identification confirmation indicator.

At block 406, the apparatus 200 includes means, such as identity confirmation module 210, communications module 208, processor 202, and/or the like, or a combination thereof, to transmit, to the user device, an identification completed notification to cause the user device to forward at least a portion of the identification completed notification to a service provider device associated with the near-field event, wherein the forwarded portion of the identification completed notification comprises at least access information for retrieving the identification confirmation indicator. In some embodiments, the access information may have been received from the user device. In other embodiments, the apparatus 200 may include means to generate the access information. In some embodiments, the service provider device associated with the near-field event is communicable with a near-field terminal device involved in the near-field event. For example, the near-field terminal device may be a payment terminal device configured communicable with a service provider device for receiving payment information via a near-field item, and providing or forwarding the payment information to the service provider device for use in facilitating completion of the payment and/or provision of an associated service. In some embodiments, the identification completed notification is provided as a response to the transmission of the electronic transmission data.

At optional block 408, the apparatus 200 includes identity confirmation module 210, repository management module 212, processor 202, and/or the like, or a combination thereof, to generate an identification confirmation record. In some embodiments, the identification confirmation record comprises the identification completed notification transmitted to the user device. In other embodiments, the identification confirmation record comprises one or more of the identity-linked device information, access information, service provider expected user device identity information, and/or identification confirmation indicator. Alternatively or additionally, the identification completed notification may include metadata associated with receiving the electronic data transmission, determining the identification confirmation indicator, and/or transmitting the identification completed notification to the user device.

At optional block 410, the apparatus 200 includes means, such as identity confirmation module 210, repository management module 212, communications module 208, processor 202, and/or the like, or a combination thereof, to store the identification confirmation record to a record repository. In some embodiments, the record repository may be a sub-repository, or otherwise associated with, a database or repository managed by the apparatus 200. In some embodiments, the record repository is embodied by a blockchain storage configured to store one or more identification confirmation record(s). The blockchain storage may be managed directly by the apparatus 200, or associated with a remote device, server, or the like. For example, in some embodiments, the apparatus 200 may store the identification confirmation record by communicating with the record repository, or a device associated with managing the record repository, via one or more APIs.

At block 412, the apparatus 200 includes means, such as identity confirmation module 210, repository management module 212, communications module 208, processor 202, and/or the like, to receive, from the service provider device, an identification verification query comprising at least the access information. In some embodiments, the service provider device may receive the access query as at least a portion of the identification completed notification forwarded from the user device to the service provider device.

In some embodiments, the identification verification query may represent a request to retrieve the identification confirmation indicator associated with the access information. In response to receiving the identification verification query, the apparatus 200 may retrieve the identification confirmation indicator from a repository using the access information. For example, the apparatus 200 may query the repository using the access information, and receive the identification confirmation indicator as response information.

At block 414, the apparatus 200 includes means, such as identity confirmation module 210, communications module 208, processor 202, and/or the like, to transmit the identification confirmation indicator to the service provider device in response to the identification verification query. The identification confirmation indicator may embody an identification success indicator or an identification failed indicator. The identification confirmation indicator may be configured to cause the service provider device to take one or more actions based on the identification confirmation indicator. For example, in some embodiments, the service provider device may be caused to authorize and/or complete a transaction associated with the near-field event in a circumstance where the identification confirmation indicator is embodied or represented by an identification success indicator. Alternatively, in some embodiments, the service provider device ay be caused to terminate a transaction associated with the near-field event in a circumstance where the identification confirmation indicator is embodied or represented by an identification failed indicator. It should be appreciated that the service provider device may be caused, in response to receiving the identification confirmation indicator, to provide or terminate provision of one or more services configured to be provided via the service provider device.

FIG. 5 illustrates example operations to determine an identification confirmation indicator, in accordance with some example embodiments of the present disclosure, for example performed by a user identification system embodied by apparatus 200.

At block 502, the apparatus 200 includes means, such as identity confirmation module 210, communications module 208, processor 202, and/or the like, or a combination thereof, to receive an item identifier associated with the near-field item. In some embodiments, the apparatus 200 may receive, from the user device, an electronic data transmission comprising the item identifier. The item identifier may have been forwarded from a near-field terminal device to an associated service provider device, and from the associated service provider device to the user device. The item identifier may be associated with a performed near-field event.

At block 504, the apparatus 200 includes means, such as identity confirmation module 210, repository management module 212, processor 202, and/or the like, to retrieve approved information associated with the item identifier. In some embodiments, the apparatus 200 may store approved information in a repository. The apparatus may query the repository for approved information retrievable using the item identifier, and receive the approved information as result data in response to the query. In some embodiments, the apparatus 200 may be configured to enable a user entity to manage the approved information, for example, using a user device. For example, a user entity may, via an application executed on the user device, add new identity-linked device information associated with a near-field item by reading the near-field item (e.g., by performing a near-field event), performing user entity identification and confirmation using identity-linked device information, as described herein, and storing the identity-linked information as approved information associated with the item identifier for the near-field item. In some embodiments, approved information includes one or more identity-linked device information associated with a particular item identifier. In other embodiments, approved information includes one or more item identifiers associated with particular identity-linked device information.

At decision block 506, the apparatus 200 includes means, such as identity confirmation module 210, processor 202, and/or the like, to determine if the approved information comprises received identity-linked device information. If the approved information comprises the received identity-linked device information, the user device associated with the identity-linked device information is white-listed and/or permissioned to use the near-field item associated with the item identifier.

In a circumstance where the approved information comprises the received identity-linked device information, flow continues to block 508. At block 508, the apparatus 200 includes means, such as identity confirmation module 210, processor 202, and/or the like, to determine an identification confirmation indicator representing an identification success indicator. In a circumstance where the approved information does not comprise the received identity-linked device information, flow continues to block 510. At block 510, the apparatus 200 includes means, such as identity confirmation module 210, processor 202, and/or the like, to determine an identification confirmation indicator representing an identification failed indicator. In some embodiments, the apparatus 200 includes means to generate the identification confirmation indicator during determination.

The determined identification confirmation indicator may then be stored and/or transmitted, for example to a service provider device. For example, the determined confirmation indicator may then be provided to a service provider device to facilitate the provision of services as described above with respect to FIG. 4.

Conclusion

In some embodiments, some of the operations described above with respect to the flowcharts and/or data flows may be modified or further amplified. Furthermore, in some embodiments, additional optional operations may be included. Modifications, amplifications, or additions to the operations above may be performed in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that embodiments of the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claim. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus for identification and confirmation of a user entity associated with a near-field item, the apparatus comprising at least one processor and at least one memory, the at least one memory having computer-coded instructions therein, the computer-coded instructions configured to, in execution with the at least one processor, cause the apparatus to:
   receive, at the apparatus from a user device associated with the near-field item, via a carrier network comprising at least a carrier device, an electronic data transmission associated with the user device and indicative of response, by the user device, to a near-field verification prompt received in response to a near-field event associated with the near-field item, wherein the carrier device is configured to inject the electronic data transmission with identity-linked device information via a header enrichment process;
   determine an identification confirmation indicator based on the identity-linked device information;
   transmit, to the user device, an identification completed notification configured to cause the user device to forward a portion of the identification completed notification to a service provider device associated with the near-field event, wherein the forwarded portion of the identification completed notification comprises at least access information for retrieving the identification confirmation indicator;
   receive, from the service provider device, an identification verification query comprising at least the access information; and
   transmit the identification confirmation indicator to the service provider device in response to the identification verification query.

2. The apparatus of claim 1, wherein the computer-coded instructions are further configured to:
   generate an access identifier associated with the identification confirmation indicator,
   wherein the access information comprises at least the access identifier, and
   wherein the identification verification query comprises at least the access identifier; and
   identify the identification confirmation indicator based on the access identifier received from the service provider device.

3. The apparatus of claim 1, wherein the identity-linked device information is a mobile telephone number in a plain text format or a hashed format.

4. The apparatus of claim 1, wherein the computer-coded instructions to determine the identification confirmation indicator are configured to:
   receive an item identifier associated with the near-field item;
   retrieve approved information associated with the item identifier; and
   determine whether the approved information comprises at least the identity-linked device information, wherein the identification confirmation indicator is based on the determination.

5. The apparatus of claim 1, wherein the computer-coded instructions are further configured to:
   generate an identification confirmation record; and
   store the identification confirmation record to a record repository.

6. The apparatus of claim 5, wherein the record repository comprises a blockchain configured to store at least one identification confirmation record.

7. The apparatus of claim 1, wherein the near-field item comprises a NFC tag or a RFID tag.

8. The apparatus of claim 1, wherein the identification confirmation indicator represents an identification success indicator, and wherein the transmission of the identification confirmation indicator to the service provider device is configured to cause the service provider device to authorize a transaction associated with the near-field event.

9. A computer-implemented method for identification and confirmation of a user entity associated with a near-field item, the method comprising:
   receiving, from a user device associated with the near-field item, via a carrier network comprising at least a carrier device, an electronic data transmission associated with the user device and indicative of response, by the user device, to a near-field verification prompt received in response to a near-field event associated with the near-field item, wherein the carrier device is configured to inject the electronic data transmission with identity-linked device information via a header enrichment process;
   determining an identification confirmation indicator based on the identity-linked device information;
   transmitting, to the user device, an identification completed notification configured to cause the user device to forward a portion of the identification completed notification to a service provider device associated with the near-field event, wherein the forwarded portion of the identification completed notification comprises at least access information for retrieving the identification confirmation indicator;
   receiving, from the service provider device, an identification verification query comprising at least the access information; and
   transmitting the identification confirmation indicator to the service provider device in response to the identification verification query.

10. The method of claim 9, the method further comprising:
    generating an access identifier associated with the identification confirmation indicator,
    wherein the access information comprises at least the access identifier, and
    wherein the identification verification query comprises at least the access identifier; and
    identifying the identification confirmation indicator based on the access identifier received from the service provider device.

11. The method of claim 9, wherein the identity-linked device information is a mobile telephone number in a plain text format or a hashed format.

12. The method of claim 9, wherein determining the identification confirmation indicator comprises:
    receive an item identifier associated with the near-field item;
    retrieve approved information associated with the item identifier; and
    determine whether the approved information comprises at least the identity-linked device information, wherein the identification confirmation indicator is based on the determination.

13. The method of claim 9, further comprising:
    generate an identification confirmation record; and store the identification confirmation record to a record repository.

14. The method of claim 13, wherein the record repository comprises a blockchain configured to store at least one identification confirmation record.

15. The method of claim 9, wherein the near-field item comprises a NFC tag or a RFID tag.

16. The method of claim 9, wherein the identification confirmation indicator represents an identification success indicator, and wherein transmitting the identification confirmation indicator to the service provider device is configured to cause the service provider device to authorize a transaction associated with the near-field event.

17. A computer program product for identification and confirmation of a user entity associated with a near-field item, the computer-program product comprising a non-transitory computer readable storage medium having computer program instructions stored therein, the computer program instructions configured to, when executed by a processor, cause the processor to:
  receive, at the processor from a user device associated with the near-field item, via a carrier network comprising at least a carrier device, an electronic data transmission associated with the user device and indicative of response, by the user device, to a near-field verification prompt received in response to a near-field event associated with the near-field item, wherein the carrier device is configured to inject the electronic data transmission with identity-linked device information via a header enrichment process;
  determine an identification confirmation indicator based on the identity-linked device information;
  transmit, to the user device, an identification completed notification configured to cause the user device to forward a portion of the identification completed notification to a service provider device associated with the near-field event, wherein the forwarded portion of the identification completed notification comprises at least access information for retrieving the identification confirmation indicator;
  receive, from the service provider device, an identification verification query comprising at least the access information; and
  transmit the identification confirmation indicator to the service provider device in response to the identification verification query.

18. The computer program product of claim 17, wherein the computer program instructions are further configured to:
  generate an access identifier associated with the identification confirmation indicator,
  wherein the access information comprises at least the access identifier, and
  wherein the identification verification query comprises at least the access identifier; and
  identify the identification confirmation indicator based on the access identifier received from the service provider device.

19. The computer program product of claim 17, wherein the identity-linked device information is a mobile telephone number in a plain text format or a hashed format.

20. The computer program product of claim 17, wherein the computer program instructions to determine the identification confirmation indicator are configured to:
  receive an item identifier associated with the near-field item;
  retrieve approved information associated with the item identifier; and
  determine whether the approved information comprises at least the identity-linked device information, wherein the identification confirmation indicator is based on the determination.

21. The computer program product of claim 17, wherein the computer program instructions are further configured to:
  generate an identification confirmation record; and
  store the identification confirmation record to a record repository.

22. The computer program product of claim 21, wherein the record repository comprises a blockchain configured to store at least one identification confirmation record.

23. The computer program product of claim 17, wherein the near-field item comprises a NFC tag or a RFID tag.

24. The computer program product of claim 17, wherein the identification confirmation indicator represents an identification success indicator, and wherein the transmission of the identification confirmation indicator to the service provider device is configured to cause the service provider device to authorize a transaction associated with the near-field event.

* * * * *